United States Patent [19]

Suzuki

[11] Patent Number: 4,975,355
[45] Date of Patent: Dec. 4, 1990

[54] INFORMATION STORAGE MEDIUM

[75] Inventor: Katsumi Suzuki, Tokyo, Japan

[73] Assignee: Kabushiki Kaisha Toshiba, Kawasaki, Japan

[21] Appl. No.: 373,648

[22] Filed: Jun. 28, 1989

Related U.S. Application Data

[63] Continuation of Ser. No. 147,288, Jan. 22, 1988, abandoned.

[30] Foreign Application Priority Data

Jan. 30, 1987 [JP] Japan .................................. 62-19883

[51] Int. Cl.$^5$ .............................................. G03C 1/72
[52] U.S. Cl. ................................... 430/346; 430/290; 430/945; 430/495; 346/135.1
[58] Field of Search ............... 430/495, 945, 346, 964, 430/290; 346/135.1

[56] References Cited

U.S. PATENT DOCUMENTS

| | | | |
|---|---|---|---|
| 4,449,138 | 5/1984 | Ando ..................................... | 430/945 |
| 4,460,636 | 7/1984 | Watanabe ........................ | 430/964 X |
| 4,635,076 | 1/1987 | Willson et al. ......................... | 430/495 |
| 4,637,976 | 1/1987 | Terao et al. .......................... | 430/523 |
| 4,731,755 | 3/1988 | Bjorklund et al. ............... | 346/135.1 |
| 4,808,514 | 2/1989 | Gravesteijn et al. ................ | 430/495 |
| 4,818,666 | 4/1989 | Gravesteijn et al. ................ | 430/495 |

FOREIGN PATENT DOCUMENTS

| | | | |
|---|---|---|---|
| 0184452 | 6/1986 | European Pat. Off. . | |
| 0177446 | 9/1985 | Japan ................... | 430/945 |

OTHER PUBLICATIONS

Metallurgical Transactions, vol. 2, Mar. 1971, pp. 641-645, "Reversible Structural Transformations In Amorphous Semiconductors For Memory And Logic".
J60/177446, Funakashi, 9/11/85, FIGS. 1-4.
Suzuki et al., Erasible-Optical Disk of Phase Transition Type (3) 18p-ZP-8, Meeting of the Applied Physics Society, Autumn 1987.
Xerox Research Disclosure, Roberta M. Fay, vol. 10, No. 3, May/Jun. 1985, p. 161.

*Primary Examiner*—Paul R. Michl
*Assistant Examiner*—Lee C. Wright
*Attorney, Agent, or Firm*—Foley & Lardner, Schwartz, Jeffery, Schwaab, Mack, Blumenthal & Evans

[57] ABSTRACT

An optical disk comprises a polycarbonate substrate, a first protective layer formed on the substrate and made of $SiO_2$, a recording layer formed on the first protective layer and made of an In-Sb-Te alloy, a second protective layer formed on the recording layer and made of $SiO_2$, and a surface protective layer formed on the second protective layer and made of an ultraviolet curable resin. The recording layer has a composition of $In_{50-x}Sb_{50}Te_x$ (wherein x is in atomic % and falls within the range of $0 < x < 20$).

3 Claims, 3 Drawing Sheets

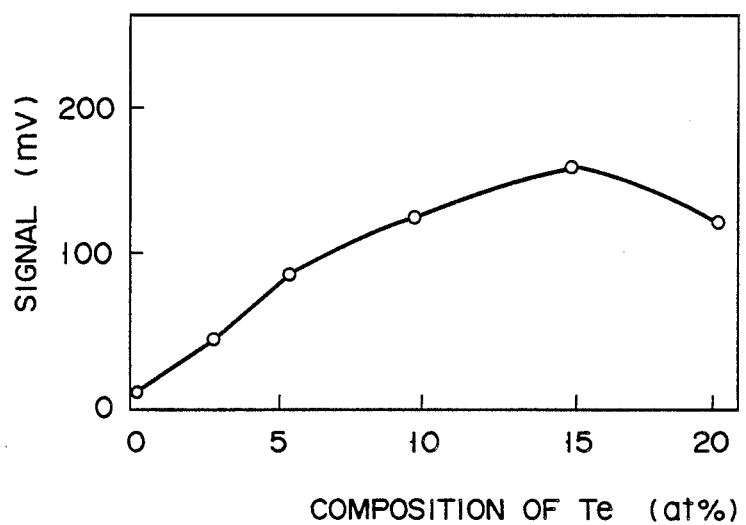
F I G. 4

INFORMATION STORAGE MEDIUM

This application is a continuation, of application Ser. No. 07/147,288 filed Jan. 22, 1988 now abandoned.

BACKGROUND OF THE INVENTION

1. Field of the Invention

The present invention relates to an information storage medium such as an optical disk for recording or erasing information by way of a phase transformation of a recording layer upon radiation of an light beam such as a laser beam.

2. Description of the Prior Art

A phase-transformation type optical disk is a typical example of an optical disk which permits information erasure. When a portion of a recording layer of a phase transformation-type optical disk is irradiated with a laser beam, that portion undergoes a phase transformation between a crystalline phase and an amorphous phase, depending on the conditions under which the laser beam is radiated, whereby information is either recorded thereon or erased therefrom.

Materials which ca undergo such phase transformation include semiconductors, semiconductor compounds, and metal alloys (such as Te, Ge, TeGe, InSe, SbSe, and SbTe). Such materials can be selectively set in a crystalline state or an amorphous state. The complex indices of refraction of these materials which is given by $N = n - ik$ differ considerably between one of these states and the other. The above two states can be alternately reversed by means of a heat treatment process employing a laser beam, thereby enabling information to be either recorded or erased (S.R. Ovshinsky, Metallurgical Transactions 2, 641, 1971).

Besides the method described above, there exists a system is which information is recorded and erased by means of reversible phase transformation between different crystalline phases by changing the conditions under which a laser beam is radiated (Japanese Patent Disclosure (Kokai) Nos. Sho61-134944). A typical example of such a material is an In-Sb alloy.

Upon radiation of a low-power laser beam having a relatively long pulse, the grains of an In-Sb alloy thin film are converted into small-crystal grains. These small-crystal grains can be quickly grown into relatively large crystal grains upon radiation of a high-power laser beam having a short pulse. The complex indices of refraction of each of these two crystal structures differ considerably. When information is read from a recording layer, upon radiation of a laser beam thereinto, the crystal states are discriminated on the basis of a difference between amounts of light reflected by surface portions of the disk.

All of the materials mentioned above whose phase can be changed between amorphous and crystalline phases, thereby to the recording or erasure of information, have a low crystallization rate, as a result of which the respective periods of time required for initialization and information erasure are undersirably long.

In an optical disk utilizing an In-Sb recording layer for alternately changing from one crystalline phase to another, an $In_{50}Sb_{50}$ intermetallic compound can be advantageously used due to its high crystallization rate, which facilitates rapid initialization and information erasure. However, it is difficult to actually record information for the reason that Sb segregation (described later) does not occur. When the In content of the recording layer is higher than the Sb content, complete phase transformation cannot always be assured, with the result that recording of information is sometimes not possible. Another variation is to make the Sb content of the recording layer slightly higher than the In content as compared with $In_{50}Sb_{50}$. When the recording layer is irradiated with a laser beam, it is converted to a mixture phase of InSb intermetallic compound crystal grains and Sb crystal grains. The size of the Sb crystal grains changes in accordance with the conditions under which the laser beam is radiated, and the information recording signal level can be maintained. However, since Sb has a low crystal growth rate, the recording layer initialization time and erase time are prolonged, thereby rendering high-speed operation impossible. More specifically, there is a tendency for initialization failure and incomplete erasure to occur. In the write mode, when the optical disk is rotated at high speed, crystal grains cannot grow sufficiently, thus resulting in unsatisfactory recording.

SUMMARY OF THE INVENTION

It is an object of the present invention to provide an information storage medium having good information storage properties and capable of initializing a recording layer and erasing information at high speed.

According to the present invention, there is provided an information storage medium comprising a substrate having a recording layer formed thereon which is subjected to reversible phase transformation between two different phases by changing the conditions under which a light beam is radiated, the recording layer containing an alloy $In_{50-x}Sb_{50}Te_x$ (wherein x is in atomic % and falls within the range of $0 < X < 20$).

According to the present invention, the recording layer is made to alternately undergo phase transformation between a mixture phase of fine grains of an InSb intermetallic compound and SbTe crystal grains and a mixture phase of fine grains of the InSb intermetallic compound and amorphous SbTe. When the recording layer is made of an alloy having a composition in the range defined in the present invention, SbTe can be easily converted from the amorphous or crystalline phase, and vice versa. As a result, initialization of the recording layer and recording/erasure of information can be performed at high speed. The complex indices of refraction of the SbTe contained in the recording layer differ considerably between the crystalline phase and the amorphous phase. As a result of this, the information-recording signal level (i.e., the contrast between recorded and non-recorded portions) of the recording layer is high.

BRIEF DESCRIPTION OF THE DRAWINGS

A more complete appreciation of the invention and many of the attendant advantages thereof will be readily obtained as the same become better understood by reference to the following detailed description when considered in connection with the accompanying drawings, in which:

FIG. 4 is a graph showing the relationship between the Te content of the recording layer and the reproduction signal.

DETAILED DESCRIPTION OF THE PREFERRED EMBODIMENT

The present invention will hereinafter be described in detail, with reference to a preferred embodiment.

When a recording layer is made of $In_{50}Sb_{50}$, the film is very stable, since $In_{50}Sb_{50}$ is an intermetallic compound. Since short-range ordering of atoms can be performed at very high speed upon radiation of a laser beam onto the recording layer, high-speed crystallization is thus possible in both the initialization mode and the erase mode. However, even if the laser beam radiation conditions are changed, the crystal grain size of $In_{50}Sb_{50}$ is not substantially changed, as a result of which information cannot be recorded.

When the Sb content of the recording layer is slightly higher than $In_{50}Sb_{50}$, a mixture phase of the $In_{50}Sb_{50}$ crystal grains and Sb crystal grains can then be achieved. Upon radiation of the laser beam, the size of the Sb crystal grains changes substantially, enabling information to be recorded on the recording layer. However, since Sb has a low rate of change from the amorphous state, obtaining immediately after film formation, to the crystalline state, and a low speed of phase transformation between different crystalline phases, the speed of initialization, as well as the speed of information erasure are undesirably low.

When a recording layer is formed of an $In_{50-x}Sb_{50}Te_x$ alloy (wherein x is in atomic % and falls within the range of $0 < X < 20$), a portion irradiated with a laser beam is changed to a mixture phase of the InSb intermetallic compound and SbTe. When SbTe is subjected to a phase transformation between the crystalline and amorphous phases upon radiation of a laser beam, the reflectivities of these phases differ greatly from each other, as a result of which a high information-recording signal level is obtained. SbTe has a high crystallization rate in the amorphous state, thereby making possible high-speed initialization and information erasure. Further, since SbTe is dispersed among fine crystals of the InSb intermetallic compound, it remains stable even in the amorphous state. As a result, reliable, stable recording can be assured at all times. In addition, SbTe can be easily converted into an amorphous phase, as a result of which the recording rate can be increased. When x exceeds 20 atomic %, other crystal phases appear upon radiation of the light beam, resulting in a reduction in contrast between the recorded and non-recorded portions. Thus, x must always be less than 20 atomic %.

Figure 1:
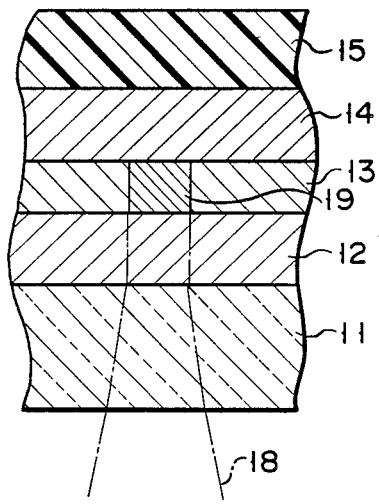
FIG. 1 is a sectional view of an information storage medium (optical disk) according to an embodiment of the present invention.

An information recording medium (optical disk) according to the present invention has a structure as shown in FIG. 1. Substrate 11 is made of a transparent material, the physical properties of which remain largely unchanged over time, such as glass or a polycarbonate resin. Protective layer 12, recording layer 13, protective layer 14, and surface protective layer 15 are formed on substrate 11, in the order given. Protective layers 12 and 14 are made of a dielectric material such as $SiO_2$, their purpose being to prevent evaporation and pinhole formation of the portion irradiated with a laser beam or the like. Surface protective layer 15 is made of a resin such as an ultraviolet curable resin, its purpose being to prevent the surface of the optical disk from being scratched during handling. Recording layer 13 is made of the $In_{50-x}Sb_{50}Te_x$ alloy (wherein x is atomic % and falls within the range of $0 < X < 20$). Recording layer 13, when irradiated with a laser beam the radiation conditions of which are controlled, undergoes a reversible phase transformation between two phases, described above.

While it is preferable to form protective layers 12, 14, and 15, formation thereof may, however, be omitted.

Figure 2:
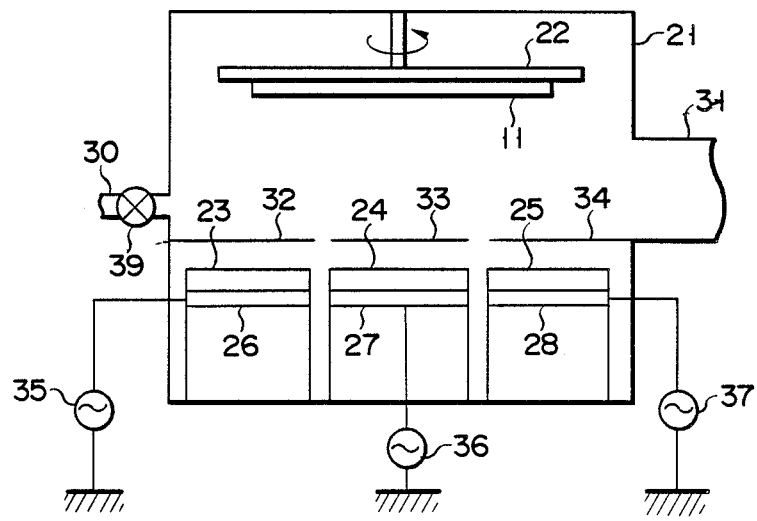
FIG. 2 is a schematic view showing a sputtering apparatus used in the fabrication of the information storage medium (optical disk) shown in FIG. 1.

A method of fabricating the information storage medium (optical disk) of this embodiment will now be described in detail, with reference to FIG. 2. FIG. 2 is a schematic view of a sputtering apparatus for forming the recording layer.

Reference numeral 21 denotes a cylindrical reaction chamber with exhaust port 31 and gas inlet port 30 formed in its wall. A cryopump is connected to exhaust port 31, for evacuating chamber 21. An argon supply device (not shown) is connected to gas inlet port 30, for supplying argon gas to chamber 21, through gas inlet port 30. Disk-like substrate 11 is horizontally supported by rotary base 22 in the upper portion of reaction chamber 21. When rotary base 22 is rotated by a motor (not shown), substrate 11 is rotated therewith. Plate electrodes 26, 27, and 28 are arranged such that they oppose substrate 11 in chamber 21. Electrodes 26, 27, and 28 are connected to RF (Radio Frequency) power sources 35, 36, and 37, respectively. In-Sb alloy target 23, having a predetermined composition, $SiO_2$ target 24, and Te target 25 are placed on electrodes 26, 27, and 28, respectively. Shutters 32, 33, and 34 are arranged between respective targets 23, 24, and 25 and substrate 25.

In order to perform sputtering, using the sputtering apparatus having the above arrangement, reaction chamber 21 is first evacuated by the cryopump to a vacuum of $10^{-}$Torr. Thereafter, argon gas is supplied to chamber 21 at a flow rate of, for example, 10 SCC to adjust the gas pressure (e.g., 5 mTorr) therein. RF power of, for example, ⓇW is supplied from RF power source 36 to $SiO_2$ target 24 while substrate 11 is being rotated at 60 rpm, to form protective layer 12 thereon. In this case, only shutter 33 is kept open. Subsequently, shutter 33 is closed and shutters 32 and 34 are opened. At the same time, RF power of, for example, 200 W is supplied from RF power sources 35 to target 23, with 20 W being supplied from RF power sources 37 to target 25, thereby to form recording layer 13 of an InSbTe alloy having a predetermined composition. RF power sources 35 and 37 are then deenergized, while RF power source 36 is energized once again. Protective film 14 is formed on recording layer 13 under the same conditions as in the case of protective film 12.

A sample thus prepared is removed from reaction chamber 21, and an ultraviolet curable resin is spin-coated on the sample. The resin is cured with ultraviolet rays, thereby forming protective layer 15.

The operation of the information storage medium (optical disk) of this embodiment will now be described below.

Initialization

Since recording layer 13 thus formed is amorphous, it must be crystallized in order to record information. The amorphous recording layer is continuously irradiated with a laser beam having a relatively low power and a large pulse width. The recording layer is melted, gradually cooled, and solidified. The recording layer is converted into a crystalline phase of fine grains of the InSb intermetallic compound and fine SbTe grains.

Recording

Initialized recording layer 13 is irradiated with laser beam 18 having a relatively high power and a small pulse width to convert the fine grains into an amorphous phase. Recording mark 19 is formed by a mixture phase of fine crystal grains of the InSb intermetallic compound and amorphous SbTe.

Reading

Recording layer 13 is irradiated with a laser beam having a relatively low power to detect an intensity of light reflected by recording mark 19, thereby reading information.

Erasure

The same laser beam radiation conditions as in initialization are set and recording mark 19 is irradiated with a laser beam under these conditions. Recording mark 19 is melted, gradually cooled, and solidified in the same manner as in initialization. In this case, amorphous $Sb_xTe_x$ is converted into fine crystal grains, and information is erased.

Figure 3:
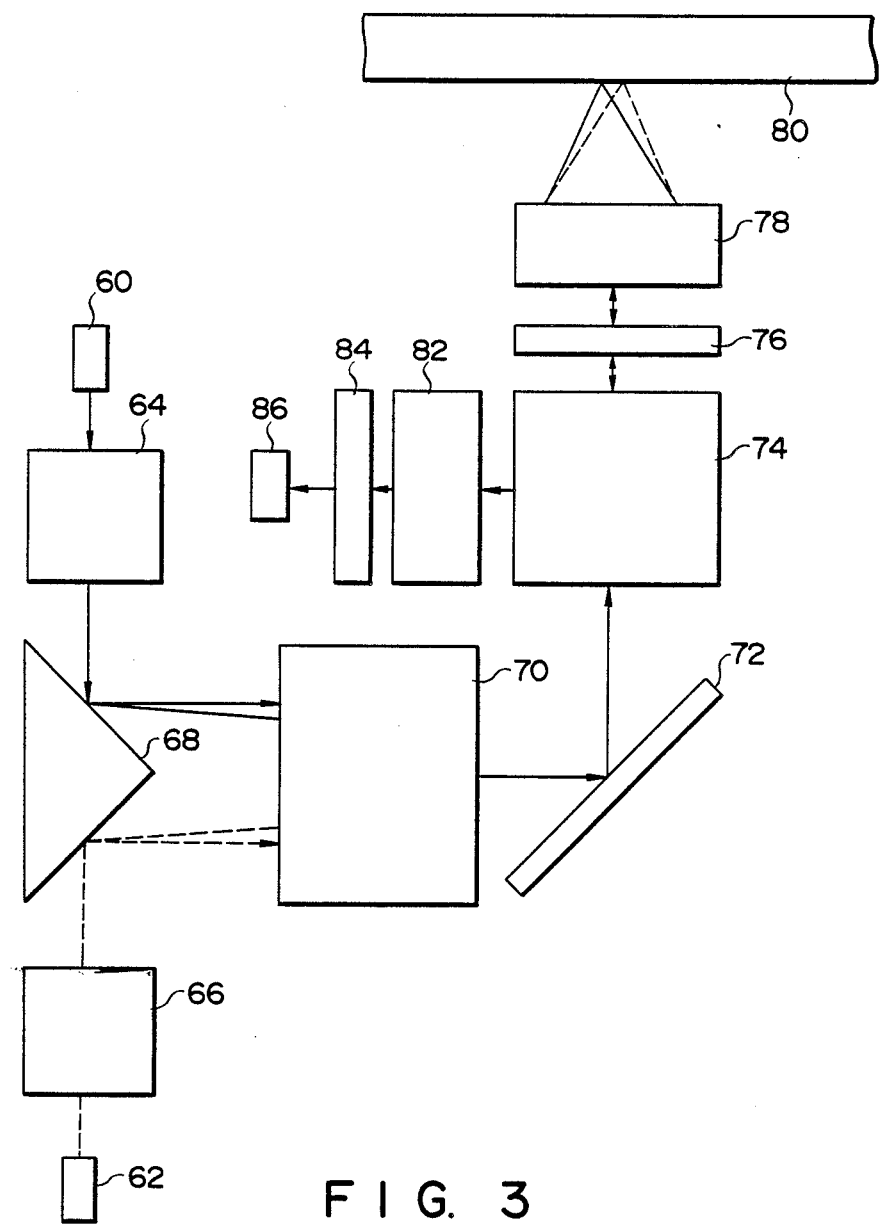
FIG. 3 is a schematic view showing an optical system for recording information in the information storage medium (FIG. 1) or reading out or erasing it therefrom.

Referring now to FIG. 3, a control optical system, which is used to record, erase, or read information on or from the information storage medium (optical disk) according to this embodiment, will be described in detail.

The optical system comprises semiconductor laser diode 60 for recording and reading information and semiconductor laser diode 62 for erasing information recorded on the optical disk. A laser beam emitted from diode 60 or 62 is focused by lens 64 or 66, and reflected by mirror 68. The reflected light from mirror 68 enters lens 70 in parallel relation to the optical axis, and is then reflected by mirror 72. The reflected laser beam from mirror 72 is introduced into beam splitter 74 and then into polarizing plate 76, whose thickness is equal to about one quarter of the wavelength of the applied laser beam. Then, the laser beam enters lens 78 and is focused thereby on optical disk 80. Lens 78 is movably supported by a drive mechanism (not shown), which serves to adjust the position of lens 78 radially and axially. Disk 80 is rotated at a speed of 10 m/s.

The reflected light from optical disk 80 enters lens 78 again and passes through plate 76. At this time, the light is polarized as it moves back and forth within plate 76, so that it is reflected by beam splitter 74 and deflected toward converging lens 82 and column lens 84. The reflected light from optical disk 80 is detected by detector 86. Lens 78 is moved by the drive mechanism so that the converged spot from lens 78 focusses on disk 80.

In recording information, a pulsating light beam (recording beam) corresponding to the information to be recorded is emitted from laser diode 60. The recording beam is applied to a predetermined portion of the recording layer of optical disk 80. The irradiated portion develops into a recording mark after undergoing the aforementioned phase transformation.

In reading information, a laser beam with an output one-tenth that of the recording beam is emitted continuously from laser diode 60. This laser beam passes through the substrate of optical disk 80, and is reflected by the recording layer. Detector 86 detects the intensity of the reflected light from the recording layer. In this case, the recording mark and the other portion of the recording layer are different in crystal grain size, as mentioned before, so that reflected light beams from these different portions are different in intensity. Thus, based on the difference in intensity between the reflected beams, the recorded information can be read reliably.

In erasing information, an erasing laser beam is emitted continuously from laser diode 62 to be applied to the recording mark. Thereupon, the recording mark undergoes phase transformation such that it changes back into a fine crystal resembling the other portion, in the manner aforesaid. As a result, the information is erased.

Examples of characteristic tests on information storage media manufactured according to the present invention will now be described.

EXAMPLE 1

A 1,000-Å thick $SiO_2$ layer was formed on a grooved polycarbonate substrate by argon sputtering. A 750-Å thick $In_{47}Sb_{50}Te_3$ (three-component) alloy layer as a recording layer was formed on the $SiO_2$ layer while the composition of the alloy was strictly controlled. A 1,000-Å thick $SiO_2$ film was formed on the recording layer, and a 10-μm thick ultraviolet curable resin layer was formed on the second $SiO_2$ layer, thereby manufacturing an optical disk. Other optical samples were manufactured following the same procedures as described above except that the compositions of the recording layers were $In_{45}Sb_{50}Te_5$, $In_{40}Sb_{50}Te_{10}$, $In_{35}Sb_{50}Te_{15}$, and $In_{30}Sb_{50}Te_{20}$. Still another sample was prepared as a comparative example following the same procedures as described above except that a composition of a recording layer was in $In_{50}Sb_{50}$. These six samples were evaluated by a dynamic characteristic evaluation device. Each disk sample was rotated at 900 rpm and a semiconductor laser having a wavelength of 830 nm was used. In initialization, continuous radiation with an output of 8 mW was performed. In recording, the laser beam having an output of 13 mW, a pulse width of 100 nsec, and a duty ratio of 50% was used. In erasing, continuous radiation at the same output as in initialization was performed.

Initialization of all samples could be completed within two revolutions of the disk.

However, initialization of an In-Sb alloy having a larger content of Sb (e.g., $In_{45}Sb_{55}$) was completed within six to eight revolutions of the disk. The initialization speeds of these samples were high.

Recording results will be described with reference to FIG. 4. The x value of $In_{50-x}Te_xSb_{50}$ is plotted along the abscissa, and the readout signal magnitude is plotted along the ordinate. The graph in FIG. 4 represents the relationship between the x value and the signal magnitude when information is recorded and is read with a 0.4-mW laser beam. The readout signal magnitude or level is very low in $In_{50}Sb_{50}$. However, the magnitude can be increased when x is increased. However, when x exceeds 15 atomic %, the readout signal level is undesirably decreased. No samples are made by using a recording layer having a composition in which x exceeds 20 atomic %. If such a sample is made, phases other than InSb and SbTe appear and information cannot be recorded.

In information erasing, the recording mark is irradiated with the erasing laser beam to completely erase information in samples having x of 15 atomic % or less during one revolution of each disk sample. However, when x exceeds 20 atomic %, a 40-mV signal of unerasing is detected under the same erasing conditions as described above and information cannot be completely erased.

EXAMPLE 2

Six disk samples were prepared following the same sputtering as in Example 1, except that x in $In_{50-x}Sb_{50}Te_x$ in each thin film was set to be 0, 1, 2, 5, 10, or 20. The samples in the as deposited state were irradiated with a 9-mW pulsed laser beam to crystallize irradiated portions. Pulse widths of the laser beam which were required for crystallization of the samples were measured. $In_{50}Sb_{50}$ which did not contain Te required a high pulse width of 15 nsec for crystallization and had a high crystallization rate. However, the samples of 1, 2, 5, 10, and 20 atomic % required pulse widths of 50 nsec, 70 nsec, 90 nsec, 300 nsec, and 1 μsec for crystallization, respectively. $In_{45}Sb_{55}$ is found to be crystallized within the pulse width of 2 to 3 μsec in an identical test. Therefore, all the samples have large crystallization rates. In the composition containing 20 atomic % of Te, initialization and information erasing were confirmed to be performed at high speed.

As described above, when the Te content is 10 atomic % or less, the crystallization time is 300 nsec or less, which is preferable in high-speed erasure. In particular, when the Te content is 5 atomic % or less, the crystallization time is 100 nsec or less. In this manner the erasing speed could be confirmed to be increased.

$In_{50}Sb_{50}$ is crystallized at a higher speed than any other sample. Nonetheless, the signal reproduced from the recording mark, i.e., a portion of the $In_{50}Sb_{50}$ layer, has a voltage value nearly equal to 0 mV. Hence, no information can be recorded on the $In_{50}Sb_{50}$.

What is claimed is:

1. A method of recording information, comprising the steps of:
    providing an information storage medium comprising a substrate and a recording layer containing an amorphous In-Sb-Te alloy comprising $In_{50-x}Sb_{50}Te_x$, wherein x is in atomic % and falls within a range of $0 < x < 20$;
    initializing the recording layer by continuous irradiation with a low power, large pulse width laser beam to convert the amorphous alloy into a crystalline phase having fine grains of SbTe dispersed among fine crystals of an InSb intermetallic compound; and
    recording information by irradiating the initialized layer with a high power, small pulse width laser beam to transform the SbTe into an amorphous state dispersed among fine crystals of an InSb intermetallic compound.

2. A method as claimed in claim 1, additionally comprising the step of erasing recorded information by continuous irradiation with a low power, large pulse width laser beam to convert the amorphous SbTe into fine crystal grains.

3. A method according to claim 2, wherein said alloy contains Te of 1 to 10 atomic %.

* * * * *